Patented June 10, 1941

2,245,550

UNITED STATES PATENT OFFICE 2,245,550

MANUFACTURE OF OXIDES OF NITROGEN

Leonid Andrussow, Mannheim, and Karl Braun, Ludwigshafen-on-the-Rhine, Germany, assignors to I. G. Farbenindustrie Aktiengesellschaft, Frankfort-on-the-Main, Germany No Drawing. Application April 26, 1938, Serial No. 204,350. In Germany May 3, 1937

4 Claims. (Cl. 23—160)

The present invention relates to improvements in the production of oxides of nitrogen in concentrated form.

It is already known that concentrated nitric acid can be obtained from aqueous nitric acid by distillation with strong sulphuric acid, but the regeneration of the sulphuric acid entails considerable costs. It is also known that aqueous nitric acid can be concentrated by reaction with oxides of nitrogen.

We have now found that from aqueous nitric acid or from mixtures of nitrous gases with water vapor there can be obtained in an advantageous manner highly concentrated oxides of nitrogen by reducing the said mixtures with gases rich in combustible hydrogen, such as hydrogen, hydrogen sulphide, methane, illuminating gas or other gas mixtures containing hydrocarbons or hydrogen sulphide and/or hydrogen, and recovering the oxides of nitrogen from the reaction mixture. In this way part of the oxygen originally contained in the nitric acid or the nitrous gases is converted into water, carbon monoxide or carbon dioxide or sulphuric acid or oxides of sulphur, and the remaining oxides of nitrogen may be separated from the water or the sulphuric acid and recovered in a concentrated form. When using hydrogen sulphide, practically the whole of the sulphur contained in the hydrogen sulphide may be converted into sulphuric acid which may be recovered in concentrated form by precipitation in stages.

The reduction may take place at temperatures of from 150° to 750° C. at any desired pressure. In order to accelerate the reduction and to lower the temperature thereof, catalysts may be used, as for example platinum, oxides of manganese, bismuth, iron, chromium or vanadium and also bauxite, aluminum oxide gel, silica gel, zeolites, bleaching earths and the like. The heat evolved in the reaction may be used wholly or in part for example for the vaporization and decomposition of the aqueous nitric acid to be worked up.

For the removal of each atom of oxygen, there are required 1 molecule of hydrogen, or ¼ molecule of hydrogen sulphide or from ¼ to ⅓ molecule of methane or corresponding amounts of other hydrocarbons. These combustible gases may be added to the gases to be worked up before the reduction chamber, as for example in the nitric acid vaporizer, or also only after the said gases have reached the reduction chamber, and the said gases may be supplied at different places. The amount of the combustible gases is regulated according to the desired degree of oxidation of the oxides of nitrogen to be recovered, the composition of which may lie between that of NO and that of $NO_2$.

When using hydrogen or hydrogen sulphide, especially highly concentrated oxides of nitrogen are obtained. When using hydrocarbons, the reaction should preferably be so conducted that mainly carbon dioxide is formed. When using the above-mentioned catalysts this is generally speaking the case.

Working with hydrogen sulphide or its derivatives is especially advantageous because in this case there is a high evolution of heat which is available for the vaporization and decomposition of fresh amounts of nitric acid, and strong sulphuric acid is obtained as a valuable product in addition to highly concentrated oxides of nitrogen.

If the obtained oxides of nitrogen are to be worked up under increased pressure, the whole process is preferably carried out under this pressure.

The following examples will further illustrate the nature of this invention but the invention is not restricted to these examples.

Example 1

1 kilogram of 62 per cent nitric acid is vaporized per hour at atmospheric pressure, whereby it is partly decomposed, and the vapors are led together with 120 liters of hydrogen into a chamber filled with quartz fragments, the temperature of the chamber being 560° C. The gases leaving the chamber are cooled to ordinary temperature; water, which contains only small amounts of nitric acid, thus separates and there is obtained a mixture of very pure oxides of nitrogen. The mixture yields, after the addition of oxygen or air, nitrogen tetroxide.

Example 2

1 kilogram of vapors obtained by vaporizing with partial decomposition 55 per cent nitric acid at atmospheric pressure is led per hour together with 33 liters of methane at 700° C. over 200 cubic centimeters of a catalyst consisting of 6 per cent of $MnO_2$, 8 per cent of $Bi_2O_3$, the remainder being $Fe_2O_3$. The oxides of nitrogen obtained by cooling after separation of the water contain in all about 12 per cent of $CO_2$ and CO. The residual gas remaining after the separation of the oxides of nitrogen consists of about 76 per cent of $CO_2$, 22 per cent of CO and 2 per cent of $CH_4$.

Example 3

55 per cent nitric acid is worked up in the manner described in Example 2 but, instead of the methane, there are used 75 liters of illuminating gas having the composition: 2 per cent of $CO_2$, 8.5 per cent of CO, 51 per cent of $H_2$, 20 per cent of $CH_4$, remainder nitrogen. The gas obtained after separation of water consists to the extent of about 85 per cent of oxides of nitrogen; the residual gas remaining after the separation of the oxides of nitrogen consists of 65 per cent of $CO_2$, 0.6 per cent of CO, 2.6 per cent of $CH_4$ and the remainder nitrogen.

Example 4

3 molecular proportions of 60 per cent nitric acid are vaporized at atmospheric pressure. The vapors are led together with 1 molecular proportion of hydrogen sulphide over quartz fragments at 550° C. Sulphuric acid and highly concentrated oxides of nitrogen are obtained.

Example 5

1 kilogram of 55 per cent nitric acid is vaporized per hour and the partly decomposed vapors are led together with 70 liters of hydrogen sulphide over 200 cubic centimeters of a catalyst consisting of 6 per cent of manganese oxide, 8 per cent of bismuth oxide and 86 per cent of iron oxide at a temperature of 470° C., the hydrogen sulphide being completely oxidized to sulphuric acid. After separating the sulphuric acid and the water, highly concentrated oxides of nitrogen remain.

Example 6

2 kilograms of 60 per cent nitric acid per hour are vaporized and led together with 150 liters of hydrogen sulphide at from 410° to 420° C. over 300 cubic centimeters of pumice stone impregnated with vanadic acid. After separating the sulphuric acid which is formed in a quantitative amount, pure oxides of nitrogen are obtained.

What we claim is:

1. The process of producing highly concentrated oxides of nitrogen which comprises heating aqueous nitric acid to vaporize it and reacting the gaseous mixture of the products so obtained with a gas containing a reducing agent selected from the group consisting of hydrogen, hydrogen sulfide and hydrocarbons and recovering the oxides of nitrogen from the reaction mixture.

2. The process of producing highly concentrated oxides of nitrogen which comprises heating aqueous nitric acid to vaporize it and reacting the gaseous mixture of the products so obtained with hydrogen sulfide and recovering the oxides of nitrogen from the reaction mixture.

3. In the process as claimed in claim 1 working in the presence of catalysts.

4. The process of producing highly concentrated oxides of nitrogen which comprises heating aqueous nitric acid to vaporize it and reacting the gaseous mixture of the products so obtained at temperatures of from 150 to 750° C. with a gas containing a reducing agent selected from the group consisting of hydrogen, hydrogen sulfide and hydrocarbons and recovering the oxides of nitrogen from the reaction mixture.

LEONID ANDRUSSOW.
KARL BRAUN.